Patented Mar. 29, 1949

2,465,391

UNITED STATES PATENT OFFICE 2,465,391

BIS-TRIALKYL CITRATE SULFITES

William J. Myles, New York, N. Y., assignor to Celanese Corporation of America, a corporation of Delaware No Drawing. Original application November 30, 1945, Serial No. 632,134. Divided and this application November 20, 1946, Serial No. 711,221

8 Claims. (Cl. 260—456)

This invention relates to the preparation of thermoplastic molding compositions, and relates more particularly to the preparation of stable thermoplastic molding compositions having a basis of a cellulose ether such as ethyl cellulose.

This application is a division of my application S. No. 632,134 filed November 30, 1945.

An object of this invention is the preparation of improved cellulose ether molding compositions of increased stability and high resistance to the action of heat, light and other agencies which tend to produce color, brittleness and surface changes in said molded materials.

Another object of this invention is the preparation of stabilized ethyl cellulose or other stable cellulose ether compositions, employing stabilizing agents which do not of themselves materially affect the viscosity, dimensional stability or resistance to crazing, or produce objectionable brittleness in the molding compositions while exerting the desired color-stabilizing action.

Other objects of this invention will appear from the following detailed description.

Thermoplastic compositions having a basis of ethyl cellulose, which compositions are widely employed commercially for the preparation of molded articles, possess certain characteristics which impair their utility. For example, some molded ethyl cellulose compositions possess an inherent yellowish color even prior to molding, while others frequently develop yellowish or yellowish-brown colors during processing operations. The latter is especially noticeable where the processing operations are accompanied by the use of heat.

Where some color is initially present in the ethyl cellulose compositons, this color may bleach to a lighter shade, or even disappear upon exposure to light. This characteristic of color instability makes a standardized or controlled application of such ethyl cellulose compositions quite difficult. Where, for example, a colorist is working with an ethyl cellulose composition which possesses some color initially, he may be able to match a particular shade to a known, colored standard without difficulty. However, on prolonged exposure of the colored compositions to light, the latter will change in shade to a very noticeable degree due to a loss of some of the color initially present in the sample because of the bleaching action of the light. When working with a particular ethyl cellulose which develops some color on molding or during other processing operations involving the use of heat, the color which is known to develop must be compensated for with care in order that the final molded product will have the exact shade which is desired. Even the slightest deviation from the desired molding conditions, such as, for example, a slight increase or decrease in the time or temperature of molding, will noticeably alter the shade. The use of many stabilizers has been proposed in order to overcome this tendency toward color instability. The object of incorporating such stabilizing agents in the ethyl cellulose compositions is to minimize any changes in shade due to the action of light or heat where the ethyl cellulose possesses some color initially, or where the ethyl cellulose tends to develop some color when molded. Color stabilization methods presently employed are characterized by the fact that they effect a marked lowering in the viscosity, heat stability and/or resistance to crazing of the stabilized material and by the fact that many of these materials of themselves impart an undesirable degree of color to the stabilized ethyl cellulose compositions. The application of stabilizing agents which do not possess these drawbacks would render thermoplastic molding compositions of ethyl cellulose much more useful and more widely applicable.

I have now discovered that the color instability of ethyl cellulose or other thermoplastic cellulose ether molding compositions may be minimized and, in some instances, entirely prevented, by incorporating therein certain sulfur compounds which exert a substantial stabilizing action on said cellulose ether compositions. In accordance with the process of my invention, these advantageous results may be achieved either by incorporating gaseous sulfur dioxide in the plasticizers employed in formulating the ethyl cellulose composition or in the ethyl cellulose itself, preferably prior to the preparation of the molded composition. This advantageous stabilizing action may also be effected by incorporating in the ethyl cellulose molding composition compounds which liberate sulfur dioxide during the preparation of the molding compositions or during molding, such as unstable organic sulfones. Yet another method of producing the desired stabilizing action comprises incorporating organic sulfites in the thermoplastic molding composition. The presence of sulfur dioxide, unstable organic sulfones, yielding sulfur dioxide, or organic sulfites in the thermoplastic molding composition, yields molded products having a lighter color than is obtainable when employing ethyl cellulose compositions in which the stabilizing agents are not present. Furthermore, I have found that the novel stabilizing agents employed in accordance with the process of my invention do not alter the properties of the cellulose ether molded materials to any appreciable extent and the latter still retain a substantial degree of resistance to crazing as well as dimensional stability and impact strength. This invention is also applicable to the preparation of film, foil, sheets, rods, tubes, and similar articles made by methods employing solvents and relatively much lower temperatures than prevail in molding, extrusion and like processes. For example, film and foil made by casting at room temperature may be exposed to high temperatures in use and therefore may beneficially have incorporated therein a heat stabilizer.

The incorporation of sulfur dioxide in gaseous form in the plasticizer may be effected by bubbling the gas through the plasticizer for from ¼ to 1 hour depending upon the amount of sulfur dioxide desired in the final ethyl cellulose composition to which the treated plasticizer is to be added. Usually the plasticizer is treated for a sufficient period of time so that it contains from 1 to 10% or more by weight, depending upon the solubility in the plasticizer. The treated plasticizer may then be combined with the ethyl cellulose in the desired amount so that the composition will contain from about 0.1 to 2% or more of sulfur dioxide on the weight of the ethyl cellulose present.

In treating ethyl cellulose in particle form with sulfur dioxide, the treatment is conveniently effected by passing the sulfur dioxide gas through the ethyl cellulose material, contained in a suitable chamber, so that the gas will diffuse through the material and in this way become absorbed. During this sulfur dioxide diffusion treatment, a rise in temperature of the ethyl cellulose material may be observed. Usually the treatment is continued for from ¼ to 1 hour, but a period of about ½ hour is usually sufficient. After treating the ethyl cellulose particles for a period of about ½ hour or so, the temperature ceases to rise. The treatment may be discontinued at the point where the temperature begins to drop. The drop in temperature indicates that absorption has ceased and the maximum quantity of sulfur dioxide has been absorbed. This gaseous absorption treatment of the ethyl cellulose particles effects an increase in weight of the latter. Preferably, any excessive sulfur dioxide present should be removed prior to molding. This may be accomplished by drying the treated ethyl cellulose material at elevated temperatures of from 40 to 100° C. as, for example, by means of infrared baking elements. The presence of excess sulfur dioxide in contact with the ethyl cellulose material does not noticeably affect the properties of the latter upon standing at room temperature. However, it is desirable, before molding operations are carried out, to remove the excess gaseous stabilizing agent. After treatment, the ethyl cellulose material even when heated does not give off any noticeable quantity of sulfur dioxide. An aqueous extract of the treated ethyl cellulose material is neutral to methyl orange indicator. Ordinarily, an aqueous extract of ethyl cellulose material has an alkaline reaction. Discs molded of this treated material, together with a suitable plasticizer, exhibit a substantially improved color, the stabilizer effectively preventing the development of an undesirable yellow or a yellow-brown color in the molded material.

While the foregoing methods of stabilizing ethyl cellulose yield very advantageous results, more convenient methods permitting substantially closer control of the stabilizing action may be effected by incorporating in said compositions certain solid or liquid sulfur compounds which liberate sulfur dioxide. These compounds may comprise organic sulfones or organic sulfites. Thus, when employing an unstable organic sulfone such as commercially available polymerized alpha-butylene sulfone, which compound is unstable under the action of heat and liberates sulfur dioxide, there is incorporated in the ethyl cellulose composition an amount of from 0.1 to 5% on the weight of the ethyl cellulose present in the stabilized thermoplastic composition.

However, the most advantageous results are obtained employing organic sulfites for the color stabilization of the ethyl cellulose molding compositions. The organic sulfites comprise the organic esters of sulfurous acid in which one or both of the hydrogen atoms are substituted by a monovalent organic radicle. These compounds are usually solids or liquids and may, therefore, be incorporated in the thermoplastic compositions in accurately controlled amounts. While I prefer to employ alkyl-substituted sulfites, such as di-ethyl sulfite, di-butyl sulfite, di-propyl sulfite, di-octyl sulfite, di-(2-ethylhexyl) sulfite, di-decyl sulfite, di-lauryl sulfite, di-octadecyl sulfite, pentaerythritol di-sulfite, bis-(butyl lactate) sulfite, bis-trimethyl citrate sulfite, bis-tributyl citrate sulfite and bis-triethyl citrate sulfite, there may also be employed aryl sulfites such as di-tolyl sulfite, as well as mixed alkyl-aryl sulfites such as butyl tolyl sulfite. Preferably, the organic sulfites should be non-volatile at the temperatures normally employed for preparing the molding compositions. These organic sulfites may be employed in amounts of from 0.05 to 5% by weight of the ethyl cellulose present in the stabilized composition. In higher concentrations, e. g. 10 to 15% by weight of the ethyl cellulose, certain of the n-alkyl sulfites, for example, n-decyl sulfite, are excellent plasticizers. Of the various organic sulfites found suitable for effecting the stabilization of ethyl cellulose molding compositions, extremely valuable results may be obtained employing the novel bis-trialkyl citrate sulfites such as, for example, bis-trimethyl citrate sulfite, bis-triethyl citrate sulfite and bis-tributyl citrate sulfite. These compounds may be prepared by reacting two mols of the corresponding trialkyl citrate with one mol of thionyl chloride.

The reaction, I believe, may be represented as follows, where R is an alkyl group:

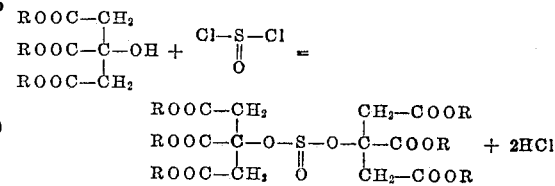

Thus, the novel compound bis-triethyl citrate sulfite may be prepared in the following manner:

552 grams (2 mols) of triethyl citrate are mixed with 158 grams (2 mols) of pyridine. There are added 660 cc. of ether and the solution is cooled to 10° C. 119 grams (1 mol) of thionyl chloride are added slowly with stirring. After about an hour, a white precipitate of pyridine hydrochloride forms. This is removed by filtering. The ether solution is then washed with 1% sulfuric acid until it is free of pyridine. This is then followed by washing with 5% sodium bicarbonate and distilled water until neutral. The ether solution may then be freed of its moisture by drying over a dessicating agent such as calcium chloride, after which it may be decolorized with active carbon, filtered, and then evaporated off.

The resulting product formed is a water white, odorless liquid, insoluble in water, with an index of refraction at 25° C. of 1.4405. It distills with great difficulty, having a boiling point of over 135° C. at 0.1 mm. The novel compounds bis-trimethyl citrate sulfite and bis-tributyl citrate sulfite may be prepared in a similar manner by reacting either trimethyl citrate or tributyl citrate with thionyl chloride, as described above.

The new citrate ester sulfites may also be prepared by other methods, for example, symmetrical mono-chlor tricarballylic acid esters or other symmetrical mono-halogen tricarballylic acid esters may be reacted with silver sulfite or the sulfite of another base which readily combines with labile halogen atoms.

The novel compound bis-(butyl lactate) sulfite having the formula:

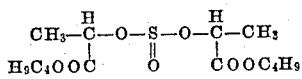

may be prepared in the following manner:

73.09 grams (0.5 mols) of butyl lactate, 79.1 grams (1.0 mol) of pyridine and 400 cc. of ether are placed in 500 cc. flask and cooled to 7° C. Then 30 grams (0.25 mols) of thionyl chloride dissolved in 100 cc. of ether are introduced slowly over a period of one-half hour maintaining the temperature between 7° C. and 14° C. After one-half hour at 14° C. the precipitate of pyridine hydrochloride which forms is filtered off and the ethereal solution washed several times with very dilute (1%) sulfuric acid to remove traces of pyridine. The ether is then evaporated leaving a yellow, slightly viscous liquid with a fruity odor having a refractive index, at 25° C., of 1.4307.

Also the novel sulfites of other esters of lactic acid or other aliphatic acid esters may be obtained by reacting aliphatic acids containing a halogen substituent in the alkyl chain with silver sulfite or the sulfite of another base which readily combines with the labile halogen atom.

The stabilizing agents may be incorporated in the ethyl cellulose molding compositions in any convenient manner. They may be mixed with the ethyl cellulose when in flake form prior to colloidallization, they may be dissolved or suspended in the plasticizers employed and the solution obtained then combined with the ethyl cellulose, or they may be mixed with the volatile solvents in which the ethyl cellulose is dissolved if a solvent casting operation is employed, as in the preparation of film materials. The stabilizing agents may also be added directly to the plastic mass while it is being converted or colloided at at elevated temperature on hot rolls, or in a suitable mill as, for example, a Banbury mixer or a Werner-Pfleiderer kneader.

The alkyl sulfites, aryl sulfites, or alkyl aryl sulfites employed as stabilizing agents in accordance with the novel process of my invention have no detrimental effect upon the plasticizers, dyes or pigments normally employed in the preparation of ethyl cellulose or other cellulose ether molding compositions.

Suitable colors which may be employed to produce the desired color effects in the final molded ethyl cellulose composition are, for example, Cobalt Purple, Cadmium Selenide Red, Chrome Orange, Ultramarine Blue, Van Dyke Brown, Monastrol Blue and Calco Condensation Yellow.

Various plasticizers may be employed alone, or in combination, to impart particular properties to the composition. The plasticizers are valuable for obtaining the desired flow characteristics, resistance to water, grease or oil, flexibility, hardness or other particular properties. Thus, for example, plasticizers, such as di-butyl phthalate, n-butyl stearate, tricresyl phosphate, triphenyl phosphate, butyl Cellosolve stearate, etc. may be satisfactorily employed in the preparation of my novel ethyl cellulose compositions. These plasticizers may be employed in amounts of from 0 to 50% or more by weight on the ethyl cellulose present in the composition. Lubricant plasticizers, such as, Fractol A, a refined mineral oil, may also be employed in amounts of from 0 to 50% or more on the weight of the ethyl cellulose. The ethyl cellulose employed in this invention may have an ethoxyl value of 44 to 49%.

In order further to illustrate my invention but without being limited thereto the following examples are given:

*Example I*

100 parts by weight of di-butyl phthalate are saturated with gaseous sulfur dioxide by bubbling the gas through the plasticizer for ½ hour. The plasticizer absorbs about 10% by weight of sulfur dioxide as a result of this treatment. 15 parts by weight of this treated plasticizer are mixed with 100 parts by weight of pre-dried ethyl cellulose flakes of 47.5% ethoxyl, so that the mixture contains 1.5% by weight of sulfur dioxide on the weight of the ethyl cellulose present. The composition obtained is molded into discs for 15 minutes at 200° C. The disc obtained has a yellowness coefficient of .39 while discs molded of the same plasticized ethyl cellulose composition but without any sulfur dioxide present have a yellowness coefficient of .69. Even a visual comparison clearly indicates the substantial improvement in color which is obtained as a result of the presence of sulfur dioxide in the molding composition.

This numerical expression of color development, i. e. the yellowness coefficient, is obtained by determining the light transmission of the sample in question at 640 m$\mu$ minus that at 440 m$\mu$, divided by the light transmission at 640 m$\mu$; the greater this coefficient, the greater the degree of color.

*Example II*

15 parts by weight of sulfur dioxide treated butyl stearate containing 6.3% by weight of sulfur dioxide are mixed with 100 parts by weight of ethyl cellulose of 45% ethoxyl to yield a composition containing 0.9% by weight of sulfur dioxide on the weight of the ethyl cellulose. The molded composition obtained is then molded at 200° C. for 15 minutes to form discs. The molded discs obtained have a yellowness coefficient of .43. Discs molded of an ethyl cellulose composition plasticized with 15% of untreated butyl stearate have a yellowness coefficient of .69.

*Example III*

100 parts by weight of ethyl cellulose, 15 parts by weight of di-butyl phthalate and 1 part by weight of finely divided unstable, commercially polymerized alpha-butylene sulfone are thoroughly mixed to obtain as great a degree of homogeneity as possible. The composition is then molded into discs at 200° C. for 15 minutes. The molded disc has a yellowness coefficient of .44 while that of a disc molded of a similar composition but in which the alpha-butylene sulfone is omitted has a yellowness coefficient of .69. Discs molded of ethyl cellulose composition containing only 0.33 part by weight of the sulfone have a yellowness coefficient of .42.

*Example IV*

Ethyl cellulose in flake form is treated with gaseous sulfur dioxide by placing the ethyl cellulose material in a suitable chamber and allowing the sulfur dioxide gas to diffuse upward through the material. The treatment is continued for about ½ hour during which time the temperature of the ethyl cellulose material rises from 28° C. to 47° C. At the end of this period, the temperature begins to drop and the treatment is discontinued. The treated ethyl cellulose flake material is then dried by baking under infra-red lamps until the odor of sulfur dioxide can no longer be detected. On heating this treated ethyl cellulose material, the latter does not give off any noticeable sulfur dioxide. A water extract of the treated ethyl cellulose gives a neutral reaction to methyl orange. 100 parts by weight of this sulfur dioxide treated ethyl cellulose is mixed with 15 parts by weight of di-butyl phthalate and discs are molded at temperatures of 180° C. and 200° C. for 15 minutes. Discs molded at 180° C. have a yellowness coefficient of .37 while those molded at 200 C. have a yellowness coefficient of .39. Discs molded at 180° C. without the preliminary sulfur dioxide treatment of the ethyl cellulose material have a yellowness coefficient of .47 while those molded of untreated ethyl cellulose at 200° C. have a yellowness coefficient of .61.

*Example V*

1 part by weight of di-ethyl sulfite is mixed with 100 parts by weight of ethyl cellulose in flake form and to this mixture is added 15 parts by weight of di-butyl phthalate and the whole is mixed until it is as homogeneous as possible. When this composition is molded into discs, at 200° C. for 15 minutes, the latter have a yellowness coefficient of .30 while like compositions which do not have the di-ethyl sulfite stabilizer present have a yellowness coefficient of .65.

*Example VI*

A mixture comprising 100 parts by weight of ethyl cellulose, 1 part by weight of di-n-butyl sulfite, 2 parts by weight of "Fractol A," and 15 parts by weight of di-butyl phthalate are thoroughly colloided in a Banbury mixer. The composition obtained is then injection molded employing a front cylinder temperature of 215° C. The molded materials obtained have a yellowness coefficient of .16 as compared with .50 for the unstabilized material.

*Example VII*

A composition comprising 100 parts by weight of ethyl cellulose, 1.0 part of di-n-propyl sulfite and 15 parts by weight of di-butyl phthalate is molded at 200° C. for 15 minutes to form discs. The discs obtained have a yellowness coefficient of .25 while unstabilized discs have a yellowness coefficient of .69.

*Example VIII*

A composition comprising 100 parts by weight of ethyl cellulose, 1 part by weight of bis-triethyl citrate sulfite and 15 parts by weight of di-butyl phthalate is molded at 200° C. for 15 minutes to form discs. The discs obtained have a yellowness coefficient of .34.

*Example IX*

Discs are molded at 200° C. for 15 minutes of the same molding composition as employed in Example VIII except that said composition contains 1 part by weight of di-lauryl sulfite in place of the stabilizer employed therein. The discs obtained have a yellowness coefficient of .38, compared with 0.63 for the unstabilized discs.

*Example X*

A composition comprising 100 parts by weight of ethyl cellulose, 15 parts by weight of di-butyl phthalate, and 3 parts of pentaerythritol di-sulfite is molded at 200° C. for 15 minutes. The discs obtained have a yellowness coefficient of .42. This stabilizing agent is also satisfactory when employed in the formation of stable molding powders, as follows:

A composition comprising 100 parts by weight of ethyl cellulose, 15 parts of di-butyl phthalate, 2 parts of "Fractol A" and 1 part by weight of pentaerythritol di-sulfite are thoroughly converted on hot rolls at 150° C. for 30 minutes, rolled thin, cooled and broken up to the form of a molding powder. The powder obtained is injection molded employing a front cylinder temperature of 215° C. and the molded material obtained nothwithstanding the drastic conditions used in preparation has a yellowness coefficient of .48.

*Example XI*

A composition comprising 100 parts by weight of ethyl cellulose, 15 parts by weight of di-butyl phthalate, 2 parts by weight of "Fractol A" and 1 part by weight of n-decyl sulfite is mixed on hot rolls at 300° F. for 20 minutes and then injection molded at 390° F. The yellowness coefficient of the injection molded material is found to be .36 compared with .69 for unstabilized material. Where n-octyl sulfite is substituted in the above composition as stabilizing agent, the injection molded sample obtained has a yellowness coefficient of .35.

*Example XII*

2 parts of the liquid bis-trimethyl citrate sulfite are mixed with 15 parts of di-butyl phthalate and 100 parts of ethyl cellulose in flake form and the composition is then molded into discs at 200° C. for 15 minutes. The yellowness coefficient of the disc obtained is .33 while that of a disc molded of the same composition without the stabilizer present at .83.

*Example XIII*

2 parts of bis-(butyl lactate) sulfite are mixed with 15 parts by weight of di-butyl phthalate and 100 parts by weight of ethyl cellulose and the composition obtained molded at 200° C. for 15 minutes. The yellowness coefficient of the disc obtained is .34 while that of an unstabilized disc molded in the same condition is .83.

It is to be understood that the foregoing detailed description is given merely by way of illustration and that many variations may be made therein without departing from the spirit of my invention.

Having described my invention, what I desire to secure by Letters Patent is:
1. Bis-trialkyl citrate sulfite.
2. Bis-trimethyl citrate sulfite.
3. Bis-triethyl citrate sulfite.
4. Bis-tributyl citrate sulfite.
5. Process for the production of bis-trialkyl citrate sulfites, which comprises reacting thionyl chloride with a trialkyl citrate.
6. Process for the production of bis-triethyl citrate sulfite, which comprises reacting thionyl chloride with triethyl citrate.
7. Process for the production of bis-trimethyl citrate sulfite, which comprises reacting trionyl chloride with trimethyl citrate.
8. Process for the production of bis-tributyl citrate sulfite, which comprises reacting thionyl chloride with tributyl citrate.

WILLIAM J. MYLES.

REFERENCES CITED

The following references are of record in the file of this patent:

UNITED STATES PATENTS

| Number | Name | Date |
| --- | --- | --- |
| 2,183,357 | Ritchie et al. | Dec. 12, 1939 |